US009553295B2

(12) United States Patent
Kim et al.

(10) Patent No.: US 9,553,295 B2
(45) Date of Patent: Jan. 24, 2017

(54) BATTERY PACK

(71) Applicant: SK Innovation Co., Ltd., Seoul (KR)

(72) Inventors: Sangyeon Kim, Yongin-si (KR); Yun Nyoung Lee, Gwangmyeong-si (KR)

(73) Assignee: SK Innovation Co., Ltd., Seoul (KR)

( * ) Notice: Subject to any disclaimer, the term of this patent is extended or adjusted under 35 U.S.C. 154(b) by 233 days.

(21) Appl. No.: 14/415,067

(22) PCT Filed: Jun. 14, 2013

(86) PCT No.: PCT/KR2013/005265
§ 371 (c)(1),
(2) Date: Jan. 15, 2015

(87) PCT Pub. No.: WO2014/014202
PCT Pub. Date: Jan. 23, 2014

(65) Prior Publication Data

US 2015/0132630 A1 May 14, 2015

(30) Foreign Application Priority Data

Jul. 16, 2012 (KR) ........................ 10-2012-0077069

(51) Int. Cl.

| | |
|---|---|
| ***H01M 2/26*** | (2006.01) |
| ***H01M 2/28*** | (2006.01) |
| ***H01M 2/24*** | (2006.01) |
| ***H01M 6/42*** | (2006.01) |
| ***H01M 2/02*** | (2006.01) |
| ***H01M 2/20*** | (2006.01) |
| ***H01M 2/30*** | (2006.01) |
| *H01M 2/10* | (2006.01) |

(52) U.S. Cl.
CPC ............. *H01M 2/204* (2013.01); *H01M 2/206* (2013.01); *H01M 2/30* (2013.01); *H01M 2/1061* (2013.01); *H01M 2220/30* (2013.01)

(58) Field of Classification Search
CPC ............ H01M 2/26; H01M 2/30; H01M 6/42; H01M 2/06; H01M 2/1016; H01M 2/1022
See application file for complete search history.

(56) References Cited

U.S. PATENT DOCUMENTS

| | | | | |
|---|---|---|---|---|
| 6,709,786 B2 * | 3/2004 | Asaka | ...................... | B60K 6/28 429/158 |
| 8,968,911 B2 * | 3/2015 | Jiang | .................. | H01M 2/1072 429/159 |
| 2007/0026306 A1 | 2/2007 | Lee et al. | | |
| 2011/0097620 A1 | 4/2011 | Kim | | |
| 2011/0287299 A1 | 11/2011 | Kim | | |

(Continued)

FOREIGN PATENT DOCUMENTS

| | | |
|---|---|---|
| EP | 2337119 A2 | 6/2011 |
| KR | 1020070014676 A | 2/2007 |

(Continued)

*Primary Examiner* — Patrick Ryan
*Assistant Examiner* — Julian Anthony
(74) *Attorney, Agent, or Firm* — The Webb Law Firm

(57) ABSTRACT

Provided is a battery pack in which a terminal stand having electrode terminals of battery modules inserted and connected thereinto is formed at one side of a sub plate in which the battery modules are seated, such that the battery modules are easily electrically connected to each other and are attachable and detachable.

5 Claims, 7 Drawing Sheets

(56) References Cited

U.S. PATENT DOCUMENTS

| | | | |
|---|---|---|---|
| 2012/0121966 | A1 | 5/2012 | Kim |
| 2013/0078487 | A1 | 3/2013 | Shin et al. |

FOREIGN PATENT DOCUMENTS

| | | | |
|---|---|---|---|
| KR | 1020080063911 | A | 7/2008 |
| KR | 1020110044130 | A | 4/2011 |
| KR | 1020110112900 | A | 10/2011 |
| KR | 1020110128593 | A | 11/2011 |
| KR | 1020120061074 | B1 | 6/2012 |

* cited by examiner

BATTERY PACK

CROSS-REFERENCE TO RELATED APPLICATIONS

This application is the United States national phase of International Application No. PCT/KR2013/005265 filed Jun. 14, 2013, and claims priority to Korean Patent Application No. 10-2012-0077069 filed Jul. 16, 2012, the disclosures of which are hereby incorporated in their entirety by reference.

TECHNICAL FIELD

The present invention relates to a battery pack in which electrode terminals of a plurality of battery modules are easily electrically connected to each other using a terminal stand and the battery modules are attachable and detachable.

BACKGROUND ART

Generally, since a secondary battery may be charged and discharged unlike a primary battery, the secondary battery has been applied to various fields such as a digital camera, a cellular phone, a laptop computer, and a hybrid vehicle and has been actively studied. An example of the secondary battery includes a nickel-cadmium battery, a nickel-metal hydride battery, a nickel-hydrogen battery, and a lithium secondary battery. In addition, among these secondary batteries, the lithium secondary battery having a high energy density and a discharging voltage has been mainly studied, and has been commercialized and widely used.

Further, the secondary battery is configured in a form of a battery module in which a plurality of battery cells are stacked due to the necessity of a high output and a large capacity, and is configured of one battery pack by stacking and arranging a plurality of battery modules in parallel with each other and connecting positive electrode terminals and negative electrode terminals of neighboring battery modules to each other by bus bars.

Here, the bus bar has through-holes formed in both sides thereof, and the positive electrode terminal and the negative electrode terminal protruding outwardly of the battery modules are inserted into the through-holes and are fastened and are closely adhered and coupled thereto by a nut, thereby forming the battery pack in which the positive electrode terminal and the negative electrode terminal are electrically connected to each other.

However, when the battery modules are connected to each other by fastening the nut as described above, it is difficult to assemble the battery pack by stacking the battery modules or to perform disassembling and assembling at the time of maintenance due to abnormality of the battery pack.

As the related art, EP Patent Publication Application No. 2,337,119 entitled "Medium or Large Battery Pack Including Electrode Connection Device" has been disclosed.

RELATED ART DOCUMENT

Patent Document

EP 2337119 A2 (2011 Jun. 22)

DISCLOSURE

Technical Problem

An object of the present invention is to provide a battery pack in which electrode terminals of battery modules are easily connected to each other and the battery modules are attachable and detachable.

Technical Solution

In one general aspect, a battery pack includes: a plurality of socket terminals having a plurality of elastic contactors extendedly formed at one side of a cylindrical body thereof so as to be spaced apart from each other by a predetermined distance in a circumferential direction; a plurality of sockets enclosing outer sides of the socket terminals and coupled to the socket terminals so as to be closely adhered thereto; a plurality of flexible bus bars having both sides coupled to a pair of sockets; a case having the socket terminals, the sockets, and the flexible bus bars accommodated therein and fixed thereto; a sub plate having the case coupled thereto; and a plurality of battery modules seated in the sub plate and having electrode terminals protruding from one side thereof, the electrode terminal being closely adhered and coupled into the socket terminals so as to be inserted into the socket terminals to thereby be electrically connected thereto.

The sub plate may have a support part formed so as to support an opposite side to a side of the case to which the battery modules are closely adhered.

The case may have a plurality of accommodating parts formed therein by partition walls partitioning an inner portion thereof, and a pair of socket terminals, a pair of sockets, and the flexible bus bar may be accommodated in and fixed to each of the plurality of accommodating parts.

The case may have seating parts formed at each accommodating part thereof so that both sides of the flexible bus bar are seated and have fixing protrusions protruding from both sides of an inner portion of the accommodating part, and the flexible bus bar may have cut parts formed therein so as to correspond to the fixing protrusions, such that the flexible bus bar is closely adhered and fixed to the seating parts by the fixing protrusion.

The battery module may have a groove or a protrusion at one side thereof so as to be attached and detached.

Advantageous Effects

In the battery pack having attachable and detachable battery modules according to an exemplary embodiment of the present invention, since a terminal stand into which the electrode terminals of the battery modules may be inserted and connected in a press-fitting scheme is formed at one side of the sub plate in which the plurality of battery modules are seated, the battery modules are easily electrically connected to each other and are easily attached and detached.

[Detailed Description of Main Elements]

| | |
|---|---|
| 1000: battery pack | |
| 100: battery module | |
| 110: electrode terminal | 111: protruding end |
| 120: protrusion (groove) | |
| 200: socket terminal | |
| 210: body | 211: coupling hole |
| 212: rotation preventing groove | |
| 220: elastic contactor | 221: bent part |
| 300: socket | |
| 310: body | 311: hooking protrusion |
| 312: jaw | 320: vertical plate |
| 500: case | |
| 510: case body | 511: seating part |
| 520: partition wall | 521: fixing protrusion |
| 530: cover | 540: fixing ring |
| 600: flexible bus bar | |
| 610: through-hole | 611: bent part |
| 612: cut part | |
| 700: sub plate | |
| 710: horizontal part | 720: vertical part |
| 730: support part | |
| 731: support plate | 732: rib |

BEST MODE

A battery pack according to an exemplary embodiment of the present invention will be described in detail with reference to the accompanying drawings.

Figure 1:
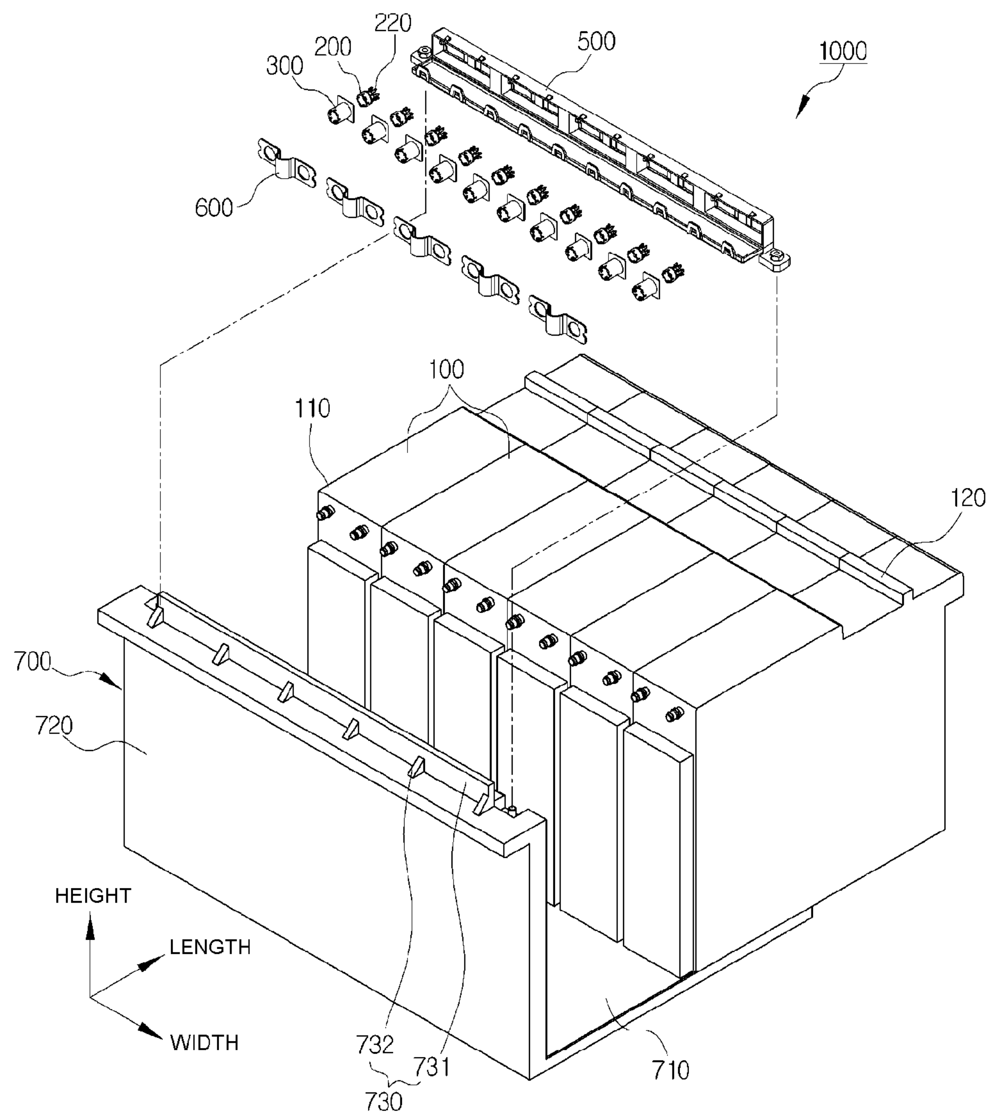
FIGS. 1 to 3 are an exploded perspective view and an assembled perspective view showing a battery pack having attachable and detachable battery modules according to an exemplary embodiment of the present invention.
Figure 2:
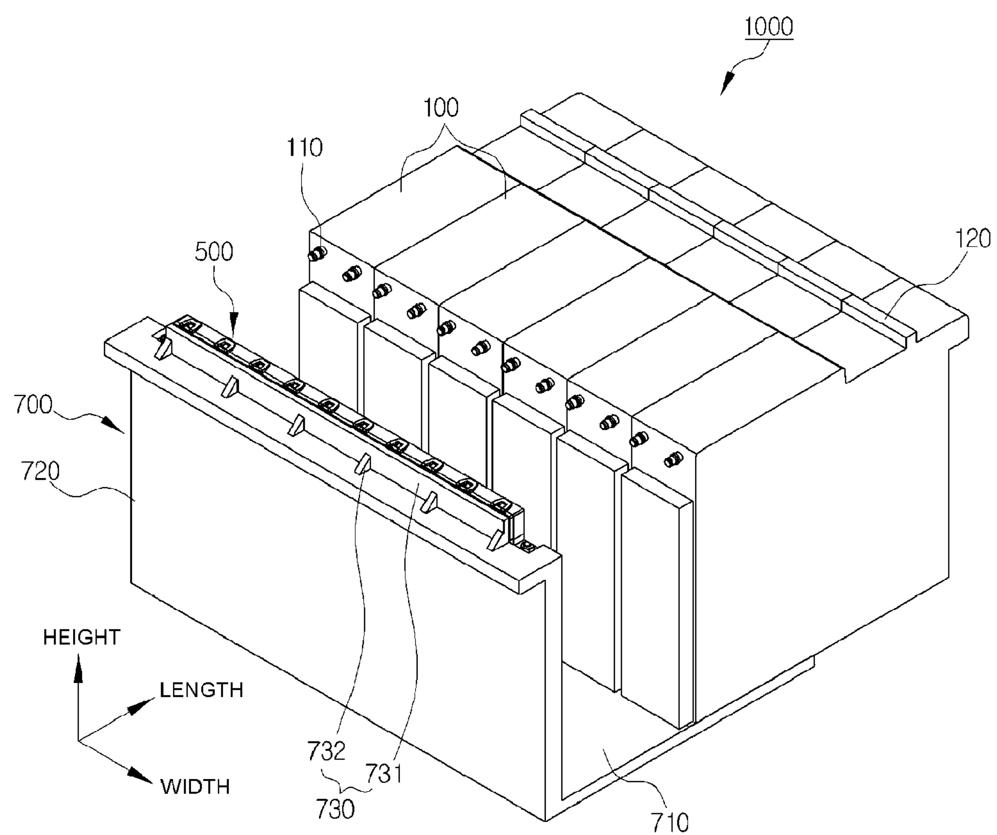
Figure 3:
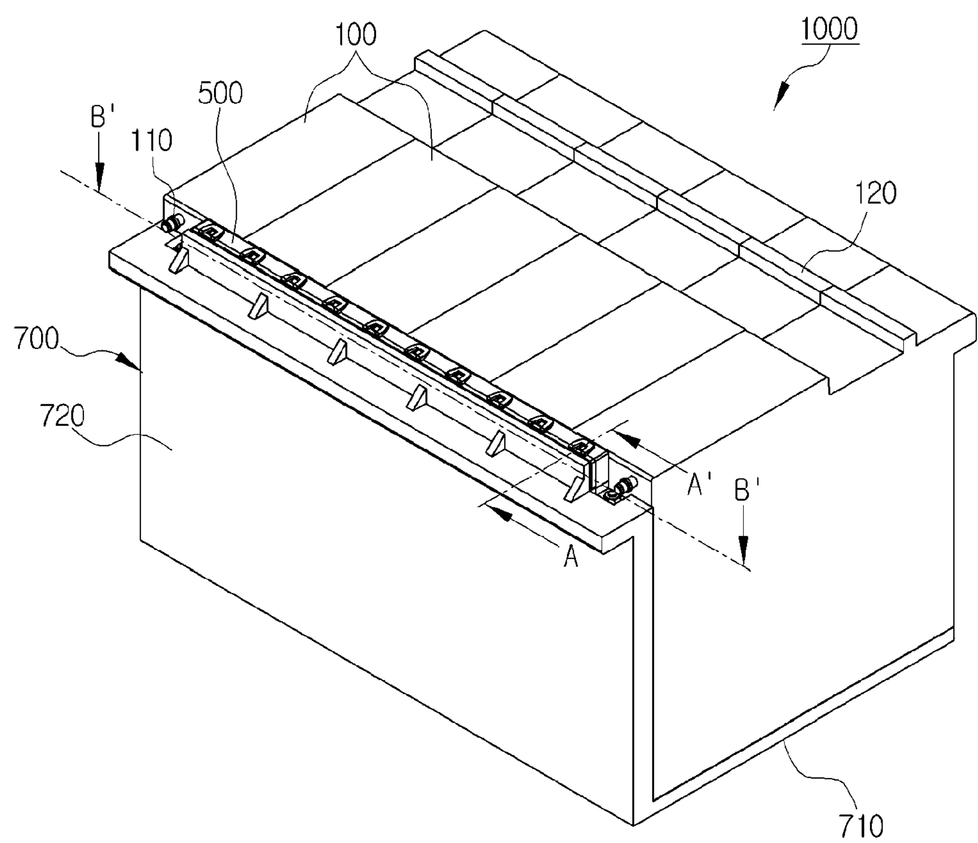

FIGS. 1 to 3 are an exploded perspective view, an assembled perspective view, and a cross-sectional view showing a battery pack according to an exemplary embodiment of the present invention.

As shown, a battery pack 1000 according to an exemplary embodiment of the present invention is configured to include a plurality of socket terminals 200 having a plurality of elastic contactors 220 extendedly formed at one side of a cylindrical body 210 thereof so as to be spaced apart from each other by a predetermined distance in a circumferential direction; a plurality of sockets 300 enclosing outer sides of the socket terminals 200 and coupled to the socket terminals 200 so as to be closely adhered thereto; a plurality of flexible bus bars 600 having both sides coupled to a pair of sockets 300; a case 500 having the socket terminals 200, the sockets 300, and the flexible bus bars 600 accommodated therein and fixed thereto; a sub plate 700 having the case 500 coupled thereto; and a plurality of battery modules 100 seated in the sub plate 700 and having electrode terminals 110 protruding from one of the sides thereof, the electrode terminals 110 being closely adhered and coupled into the socket terminals 200 so as to be inserted into the socket terminals 200 to thereby be electrically connected thereto.

First, the socket terminal 200 has the plurality of elastic contactors 220 formed at one side of the cylindrical body 210, wherein the elastic contactors 220 are formed so as to be spaced apart from each other by a predetermined distance in the circumferential direction. The cylindrical body 210 has an inner diameter larger than an outer diameter of the electrode terminal 110, such that the socket terminal 200 may be easily inserted onto the outer side of the electrode terminal 110. In addition, the elastic contactors 220 are formed in a form in which they are bent toward a central axis of the cylindrical body 210, such that an inner diameter formed by the plurality of elastic contactors 220 is smaller than the outer diameter of the electrode terminal 110. Therefore, when the socket terminal 200 is inserted onto and coupled to the outer side of the electrode terminal 110, the elastic contactors 220 of the socket terminal 200 are closely adhered to the electrode terminal 110.

The socket 300 may be inserted onto and be closely adhered and coupled to an outer side of the socket terminal 200, and be formed in a cylindrical shape so as to enclose the outer side of the socket terminal 200.

Both sides of the flexible bus bar 600 are coupled to a pair of sockets 300 by welding, or the like. Therefore, a positive electrode terminal and a negative electrode terminal of two battery modules 100 are configured so as to be electrically connected to each other by the flexible bus bar 600.

The case 500 has one side that is opened and an inner portion that is hollow, such that it is lengthily formed in a width direction, and the socket terminals 200, the sockets 300, and the flexible bus bars 600 are accommodated in and fixed to the case 500 in a state in which they are coupled to each other. As described above, a terminal stand in which the plurality of socket terminals 200, sockets 300, and flexible bus bars 600 are fixed in a state in which they are coupled to each other in the case 500.

The sub plate 700 may have a vertical part 720 formed in a 'ㄴ' shape at one side of a horizontal part 710 thereof so that the battery modules 100 may be seated therein, wherein the vertical part 720 has the case 500 coupled thereonto. Here, the case 500 has brackets formed at both sides thereof in the width direction, and through-holes are formed in the brackets, such that the case 500 may be coupled to the sub plate 700 using a fastening means at an upper side in a height direction.

In addition, the battery modules 100 having the electrode terminals 110 protruding from one sides thereof are coupled so that the electrode terminals 110 are inserted into the socket terminals 200 accommodated in the case 500.

That is, in a state in which one battery module 100 is put at an edge of the horizontal part 710 of the sub plate 700 in the width direction, after one battery module 100 is pushed toward the vertical part 720 to thereby be coupled so that the electrode terminal 110 is inserted into the socket terminal 200, the other battery modules 100 may be sequentially coupled in the same scheme as the above-mentioned scheme.

Therefore, a positive electrode terminal and a negative electrode terminal of two neighboring battery modules 100 are connected to each other by the flexible bus bar 600, such that the plurality of battery modules 100 may be connected in series with each other.

In addition, in the case of separating the assembled battery modules in order to perform check and maintenance on the battery modules, the battery modules are pulled in an opposite direction to a direction in which they are inserted and coupled, such that they may be easily separated. Here, the battery module 100 may have a groove or a protrusion 120 at one side thereof so as to be easily attached and detached.

As described above, in the battery pack according to an exemplary embodiment of the present invention, since the terminal stand into which the electrode terminals of the battery modules may be inserted and connected in a press-fitting scheme is formed at one side of the sub plate in which the plurality of battery modules are seated, the battery modules are easily electrically connected to each other and are easily attached and detached.

In addition, since the flexible bus bars may be coupled to the electrode terminals of the battery modules in the press-fitting scheme by the elastic contactors of the socket terminals inserted and coupled into the sockets, a separate tool for electrical connection of the electrode terminals is not required, and the electrode terminals are simply connected to each other. In addition, the number of processes for connecting the electrode terminals and the flexible bus bars to each other and a time required for these processes may be decreased, and quality problems such as a problem that a nut becomes loose, a contact defect, and the like, due to insufficiency of a fastening torque that may occur in a nut fastening scheme may be solved.

In addition, terminals connected to a power cable of an external device may be coupled and connected to a positive electrode terminal and a negative electrode terminal of battery modules 100 disposed at the outermost portion using the socket terminals 200 and the sockets 300.

Further, the sub plate 700 may have a support part 730 formed so as to support an opposite side to a side of the case 500 to which the battery modules 100 are closely adhered. This is to form the support part 730 on the vertical part 720 of the sub plate 700 to support the opposite side when closely adhering the battery modules 100 so that the electrode terminals 110 are inserted into the socket terminals 200 within the case 500, and the support part 730 may include a support plate 731 and a plurality of ribs 732.

Figure 4:
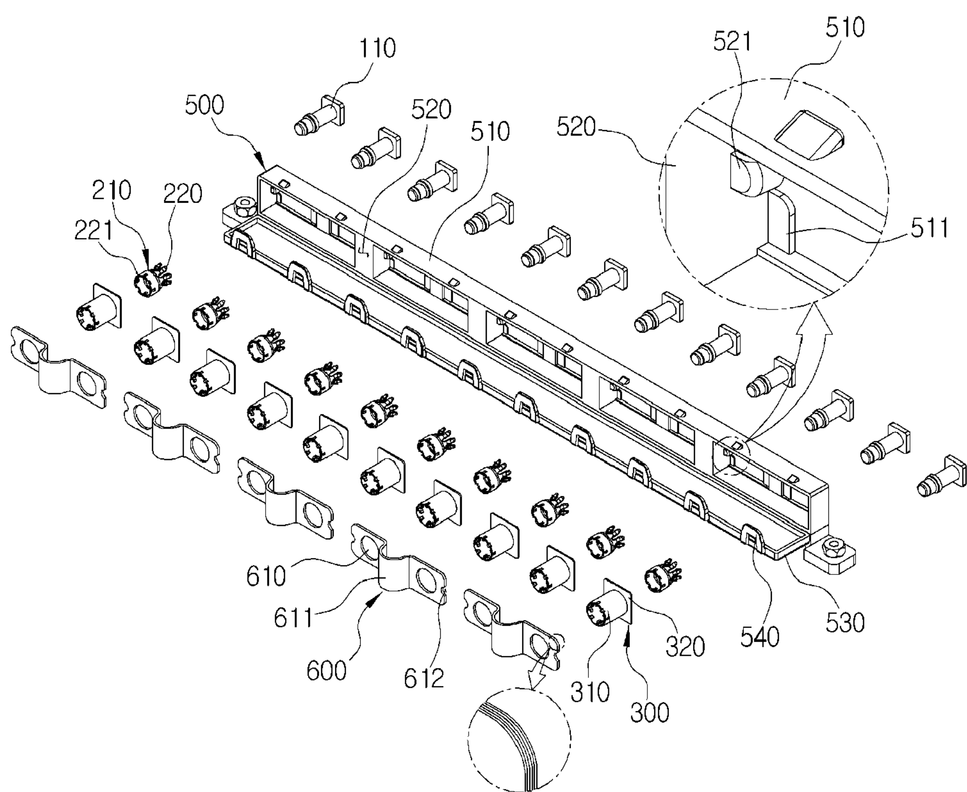
FIGS. 4 and 5 are an exploded perspective view and an assembled perspective view showing an electrode terminal connecting part according to an exemplary embodiment of the present invention.

In addition, the case 500 has a plurality of accommodating parts formed therein by partition walls 520 partitioning an inner portion thereof, as shown in FIG. 4, and a pair of socket terminals 200, a pair of sockets 300, and the flexible bus bar 600 may be accommodated in and fixed to each of the plurality of accommodating parts. Therefore, since the pair of socket terminals 200, the pair of sockets 300, and the flexible bus bar 600 are separately accommodated in each of the accommodating parts of the case 500 in a state in which they are coupled to each other, an electric short-circuit between neighboring components may be prevented, and components may be easily fixed into the case.

Figure 5:
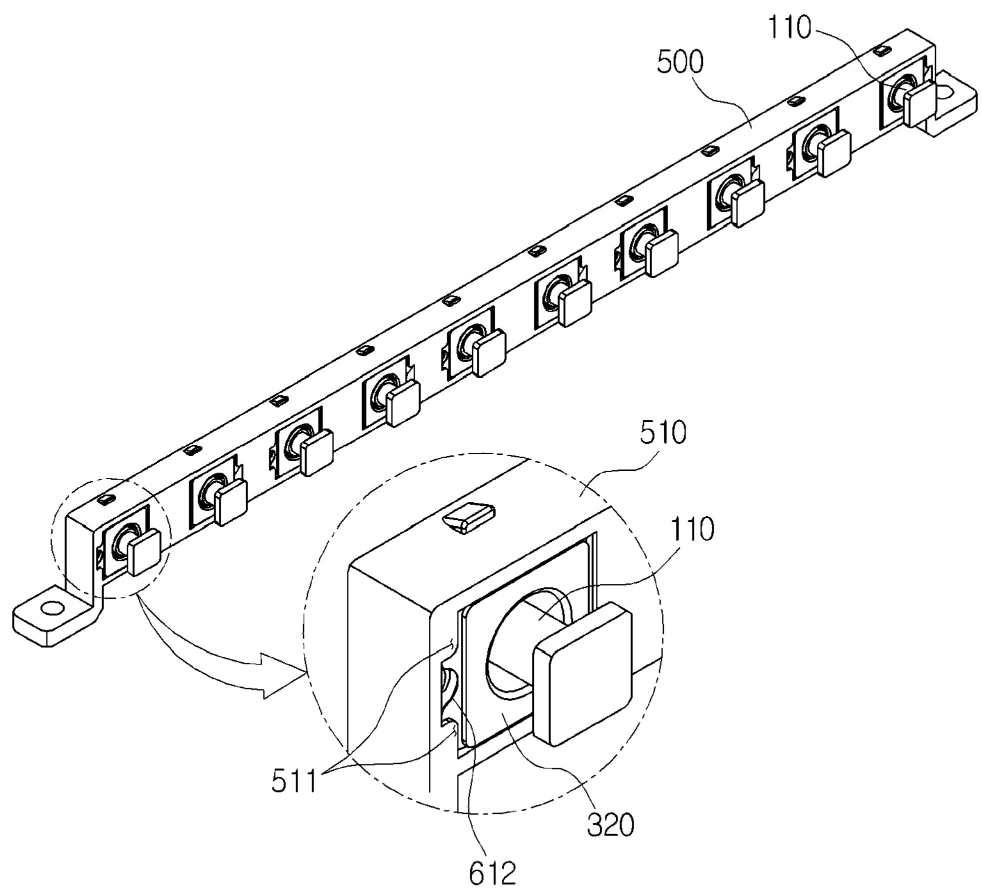

In addition, as shown in FIGS. 4 and 5, the case 500 has seating parts 511 formed at each accommodating part thereof so that both sides of the flexible bus bar 600 are seated and has fixing protrusions 521 protruding from both sides of an inner portion of the accommodating part, and the flexible bus bar 600 has cut parts 612 formed therein so as to correspond to the fixing protrusions 521, such that the flexible bus bar 600 may be closely adhered and fixed to the seating parts 511 by the fixing protrusion 521.

This is to fix the pair of socket terminals 200, the pair of sockets 300, and the flexible bus bar 600 coupled to the accommodating part, and the seating parts 511 are formed on an opened surface of the case 500 corresponding to a side into which the electrode terminals 110 of the battery modules 100 are inserted, such that one surfaces of the flexible bus bars 600 are closely adhered to the seating parts 511 and the other surfaces thereof are pressed and fixed by the fixing protrusions 521. Here, the fixing protrusion 521 may be formed in a '⌉' shape on an inner side wall of the case 500, and an outer side of a bent portion of the fixing protrusion 512 may be formed in an inclined shape or a round shape so that the cut part 612 of the flexible bus bar 600 is easily slid when being press-fitted.

In addition, the battery modules 100 may have the grooves 120 or the protrusions 120 at one sides thereof so as to be attached and detached. That is, coupled battery modules 100 may be formed so as to be pulled to be easily separated.

Figure 6:
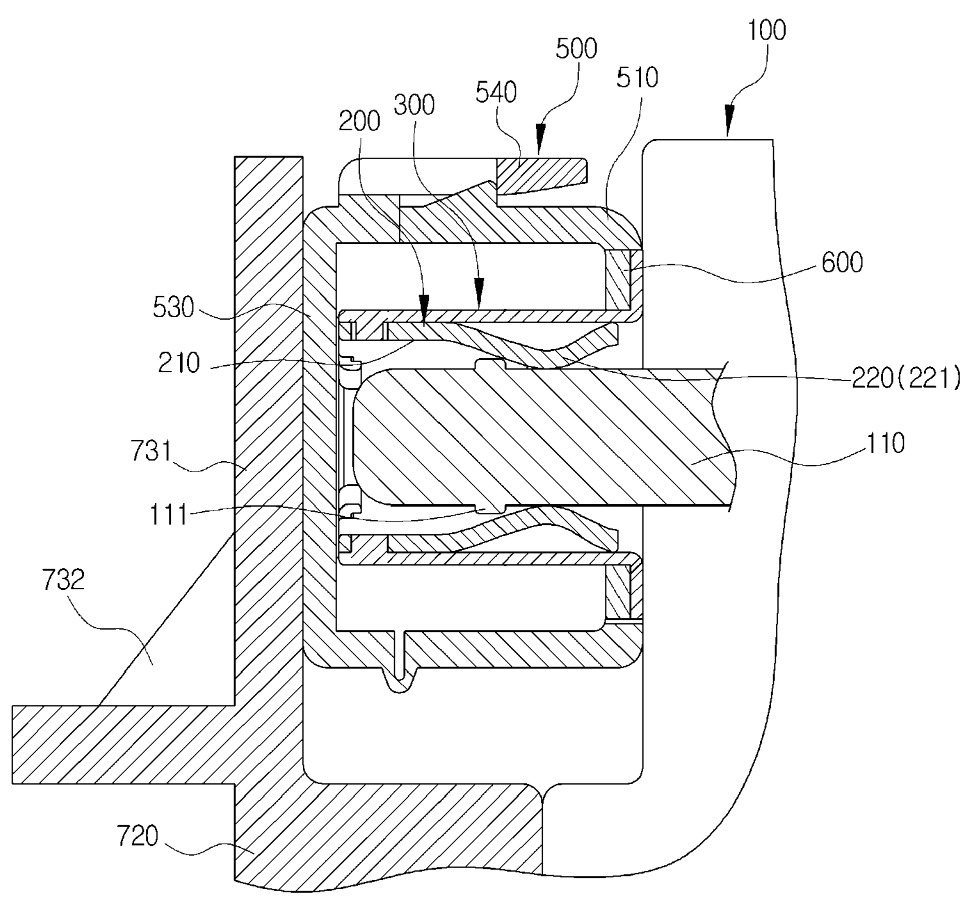
FIGS. 6 and 7 are cross-sectional views taken along line A-A' and line B-B' of FIG. 3.

In addition, the socket terminal 200 may have bent parts 221 formed by bending portions of the elastic contactors 220 in a length direction toward the center, as shown in FIG. 6, and the bent parts 221 of the elastic contactors 220 may be closely adhered to an outer peripheral surface of the electrode terminal 110. Therefore, when the electrode terminal 110 is inserted in a state in which the socket terminal 200 is inserted and coupled into the socket 300, the body 210 of the socket terminal 200 and the other sides (free ends) of the elastic contactors 220 of the socket terminal 200 are closely adhered to an inner peripheral surface of the socket 300, and the bent parts 221 are closely adhered to the outer peripheral surface of the electrode terminal 110, such that electrical connection may be stabilized. Here, the electrode terminal 110 has a protruding end 111 formed on the outer peripheral surface thereof, and the socket terminal 200 may be inserted onto and coupled to the electrode terminal 110 so that the bent parts 221 of the elastic contactor 220 are caught by the protruding end 111. Therefore, the socket terminal 200 may not be easily withdrawn in an opposite direction to a direction in which it is inserted.

In addition, the socket 300 has hooking protrusions 311 protruding on the inner peripheral surface thereof, and the socket terminal 200 has a plurality of coupling holes 211 formed in the body 210 thereof, wherein the hooking protrusions 311 may be inserted into and fixed to the coupling holes 211.

In addition, the socket 300 may have jaws 312 formed on the inner peripheral surface thereof at an opposite side to a side at which it is inserted onto the electrode terminal 110. Here, the jaw 312 has an inner diameter smaller than an outer diameter of the body 210 of the socket terminal 200, such that the socket terminal 200 may be press-fitted onto the outer side of the electrode terminal 110 without being pushed out in an opposite direction to a direction in which it is inserted.

In addition, the socket terminal 200 may have rotation preventing grooves 212 formed at one side of the body 210 thereof, wherein the rotation preventing grooves 212 have the jaws 312 inserted and seated thereinto.

In addition, the socket 300 may have a vertical plate 320 formed at one side of a cylindrical body 310 thereof enclosing the outer side of the socket terminal 200 and closely adhered to the outer side of the socket terminal 200, and the flexible bus bar 600 may be closely adhered and coupled to the vertical plate 320. That is, when the vertical plate 320 is formed at one side of the cylindrical body 310 of the socket 300, the flexible bus bar 600 may be closely adhered and then welded to the vertical plate 320, such that coupling and electrical connection may be facilitated.

In addition, the flexible bus bar 600 is formed in a form in which the plurality of thin plates are stacked, has the bent part 611 formed in a U shape at the center thereof, and has both sides connected to the electrode terminals 110 of the neighboring battery modules 100. Here, the flexible bus bar 600 may have through-holes 610 formed at both sides thereof, and be coupled to the battery modules 100 so that the positive electrode terminal and the negative electrode terminal of the battery modules 100 are inserted into the through-holes 610. In addition, since the flexible bus bar 600 is formed by stacking the plurality of thin plates and has the bent part 611 formed at the center thereof, even though the flexible bus bar 600 is formed of a metal having excellent conductivity, the flexible bus bar 600 may be flexible and have elasticity to increase or decrease a distance between the through-holes 610 into which the electrode terminals 110 are inserted and absorb vibrations.

Figure 7:
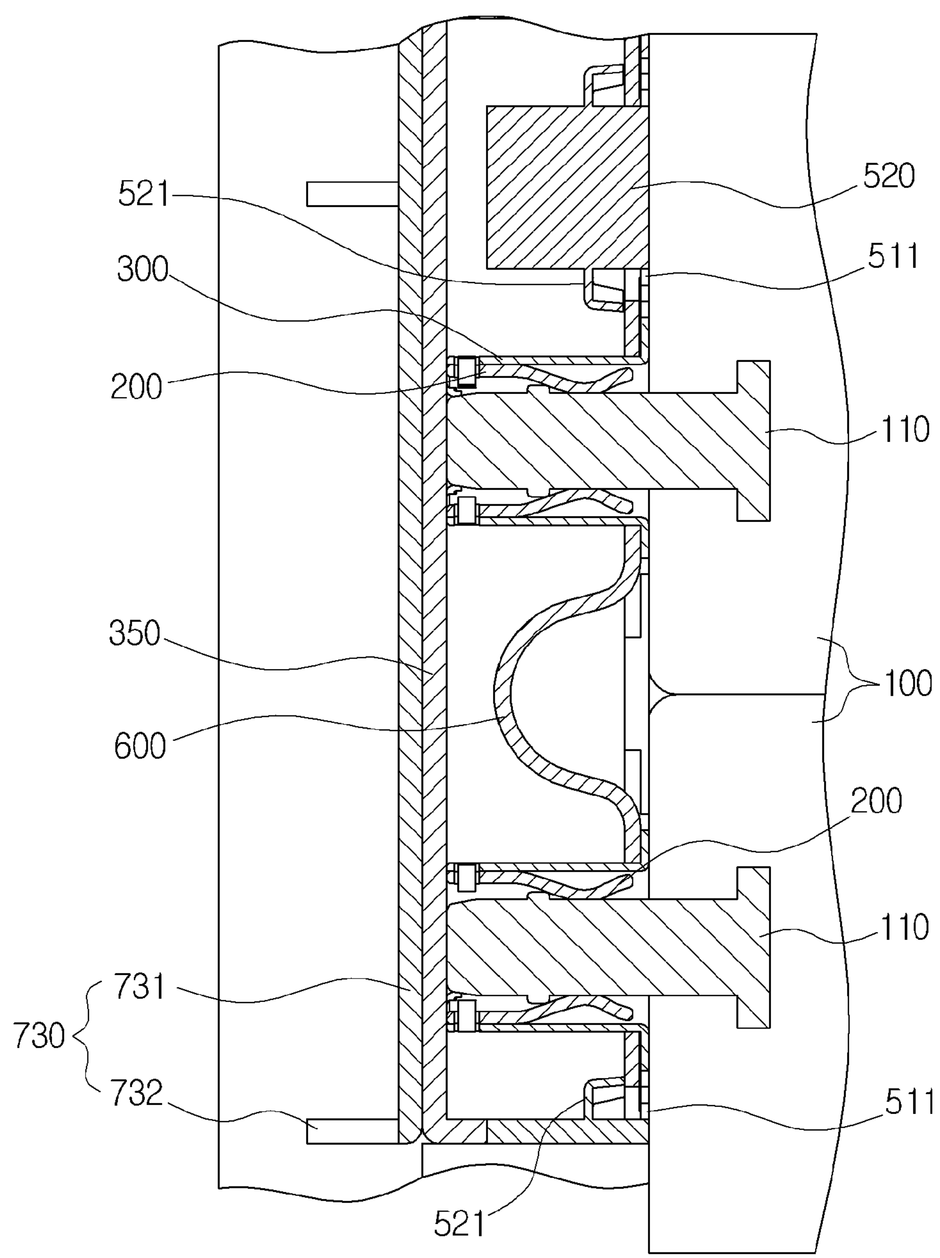

In addition, the case 500 includes a cover 530 hinge-coupled to opened one side of a case body 510 of which both sides are opened and a fixing ring 540 hinge-coupled to the cover 530, wherein the cover 530 may be closed and the fixing ring 540 may be hooked and fixed to fixing protrusions formed on the case body 510. Here, the case 500 may be fixed to the sub plate 700 to enclose the electrode terminals 110, the socket terminals 200, the sockets 300, and the flexible bus bars 600, and the cover 530 of the case 500 may closely adhere the socket terminals 200 and the sockets 300 to the electrode terminals 110 in the direction in which the socket terminals 200 and the sockets 300 are inserted onto the electrode terminals 110, as shown in FIGS. 6 and 7, to prevent the socket terminals 200 and the sockets 300 from being separated from the electrode terminals 110.

The present invention is not limited to the above-mentioned exemplary embodiments but may be variously applied, and may be variously modified by those skilled in the art to which the present invention pertains without departing from the gist of the present invention claimed in the claims.

The invention claimed is:

1. A battery pack comprising:

a plurality of socket terminals having a plurality of elastic contactors extendedly formed at one side of a cylindrical body thereof so as to be spaced apart from each other by a predetermined distance in a circumferential direction;

a plurality of sockets enclosing outer sides of the socket terminals and coupled to the socket terminals so as to be closely adhered thereto;

a plurality of flexible bus bars having both sides coupled to a pair of sockets;

a case having the socket terminals, the sockets, and the flexible bus bars accommodated therein and fixed thereto;

a sub plate having the case coupled thereto; and a plurality of battery modules seated in the sub plate and having electrode terminals protruding from one side thereof, the electrode terminal being closely adhered and coupled into the socket terminals so as to be inserted into the socket terminals to thereby be electrically connected thereto.

2. The battery pack of claim 1, wherein the sub plate has a support part formed so as to support an opposite side to a side of the case to which the battery modules are closely adhered.

3. The battery pack of claim 1, wherein the case has a plurality of accommodating parts formed therein by partition walls partitioning an inner portion thereof, and a pair of socket terminals, a pair of sockets, and the flexible bus bar are accommodated in and fixed to each of the plurality of accommodating parts.

4. The battery pack of claim 3, wherein the case has seating parts formed at each accommodating part thereof so that both sides of the flexible bus bar are seated and has fixing protrusions protruding from both sides of an inner portion of the accommodating part, and the flexible bus bar has cut parts formed therein so as to correspond to the fixing protrusions, such that the flexible bus bar is closely adhered and fixed to the seating parts by the fixing protrusion.

5. The battery pack of claim 1, wherein the battery module has a groove or a protrusion at one side thereof so as to be attached and detached.

* * * * *